United States Patent
Pozin et al.

(10) Patent No.: US 8,273,483 B2
(45) Date of Patent: Sep. 25, 2012

(54) LITHIUM CELL

(75) Inventors: Michael Pozin, Brookfield, CT (US);
Michael Sliger, New Milford, CT (US);
Nikolai N. Issaev, Woodbridge, CT (US)

(73) Assignee: The Gillette Company, Boston, MA (US)

( * ) Notice: Subject to any disclaimer, the term of this patent is extended or adjusted under 35 U.S.C. 154(b) by 1008 days.

(21) Appl. No.: 12/069,953

(22) Filed: Feb. 14, 2008

(65) Prior Publication Data
US 2009/0208849 A1 Aug. 20, 2009

(51) Int. Cl.
*H01M 6/16* (2006.01)

(52) U.S. Cl. ........ 429/324; 429/325; 429/326; 429/337; 429/340

(58) Field of Classification Search .............. 429/324, 429/337, 221, 325, 326, 340; 29/623.2
See application file for complete search history.

(56) References Cited

U.S. PATENT DOCUMENTS

| | | | |
|---|---|---|---|
| 4,416,960 A | | 11/1983 | Eustace et al. |
| 4,794,057 A | | 12/1988 | Griffin |
| 4,835,075 A | * | 5/1989 | Tajima et al. .............. 429/231.8 |
| 4,952,330 A | | 8/1990 | Leger |
| 4,959,281 A | | 9/1990 | Nishi |
| 5,229,227 A | | 7/1993 | Webber |
| 5,290,414 A | | 3/1994 | Marple |
| 5,432,030 A | | 7/1995 | Vourlis |
| 5,487,960 A | | 1/1996 | Tanaka |
| 5,514,491 A | | 5/1996 | Webber |
| 5,698,176 A | | 12/1997 | Capparella |
| 5,962,171 A | * | 10/1999 | Boguslavsky et al. ........ 429/325 |
| 6,218,054 B1 | | 4/2001 | Webber |
| 6,280,883 B1 | | 8/2001 | Lamanna |
| 6,344,293 B1 | * | 2/2002 | Geronov .................... 429/218.1 |
| 6,849,360 B2 | | 2/2005 | Marple |
| 6,866,965 B2 | | 3/2005 | Lee |
| 7,157,185 B2 | | 1/2007 | Marple |
| 2003/0118914 A1 | * | 6/2003 | Mori ............................. 429/340 |
| 2005/0233214 A1 | | 10/2005 | Marple |
| 2005/0244706 A1 | | 11/2005 | Wu |
| 2005/0277023 A1 | | 12/2005 | Marple |
| 2006/0019161 A1 | | 1/2006 | Issaev |

(Continued)

FOREIGN PATENT DOCUMENTS
EP 0486704 5/1992
(Continued)

OTHER PUBLICATIONS
Raw translation of JP2002-075446.*

*Primary Examiner* — Patrick Ryan
*Assistant Examiner* — Alex Usyatinsky
(74) *Attorney, Agent, or Firm* — Vladimir Vitenberg (57) ABSTRACT

A primary cell having an anode comprising lithium or lithium alloy and a cathode comprising iron disulfide ($FeS_2$) and carbon particles. The electrolyte comprises a lithium salt preferably lithium iodide (LiI) dissolved in an organic solvent mixture. The solvent mixture preferably comprises dioxolane, dimethoxyethane and sulfolane. The electrolyte typically contains between about 100 and 2000 parts by weight water per million parts by weight (ppm) electrolyte therein. A cathode slurry is prepared comprising iron disulfide powder, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

12 Claims, 5 Drawing Sheets

U.S. PATENT DOCUMENTS

| | | |
|---|---|---|
| 2006/0046152 A1 | 3/2006 | Webber |
| 2006/0046153 A1 | 3/2006 | Webber |
| 2006/0046154 A1 | 3/2006 | Webber |
| 2006/0228620 A1 | 10/2006 | Martinson |
| 2007/0072076 A1* | 3/2007 | Kolosnitsyn et al. ...... 429/218.1 |
| 2007/0202409 A1 | 8/2007 | Yamakawa |
| 2008/0003500 A1 | 1/2008 | Issaev et al. |
| 2008/0026293 A1* | 1/2008 | Marple et al. ............ 429/231.95 |
| 2008/0026296 A1* | 1/2008 | Bowden et al. ................ 429/329 |
| 2008/0057403 A1 | 3/2008 | Issaev et al. |
| 2008/0254343 A1 | 10/2008 | Kaplin et al. |
| 2009/0023054 A1 | 1/2009 | Jiang et al. |
| 2009/0186263 A1 | 7/2009 | Pozin |

FOREIGN PATENT DOCUMENTS

| | | | |
|---|---|---|---|
| EP | 0573266 | | 12/1993 |
| EP | 0529802 B1 | | 4/2000 |
| JP | 2002-075446 | * | 3/2002 |
| JP | 2007-157332 A | | 6/2007 |
| WO | WO 2007-049215 | | 5/2007 |

* cited by examiner

Fig. 5

LITHIUM CELL

FIELD OF THE INVENTION

The invention relates to a primary lithium cell having an anode comprising lithium metal or lithium alloy and a cathode comprising iron disulfide and an electrolyte comprising a lithium salt and organic solvents comprising preferably dioxolane, dimethoxyethane and sulfolane in admixture.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternative primary lithium cells with lithium metal anodes but having different cathodes, are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from −1 in $FeS_2$ to −2 in $Li_2S$. In order to carry out the electrochemical reaction the lithium ions, $Li^+$, produced at the anode must transport through the separator and electrolyte medium and to the cathode.

Overall the $Li/FeS_2$ cell is much more powerful than the same size $Zn/MnO_2$ alkaline cell. That is for a given continuous current drain, particularly at higher current drain over 200 milliAmp, the voltage is flatter for longer periods for the $Li/FeS_2$ cell than the $Zn/MnO_2$ alkaline cell as may be evident in a voltage vs. time profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can be used as a replacement for the same size rechargeable nickel metal hydride cell, which has about the same voltage (fresh) as the $Li/FeS_2$ cell.

One disadvantage of the $Li/FeS_2$ cell is that a passivation layer can gradually buildup on the lithium anode surface principally during cell storage or intermittent rest. The chemical nature of the passivation layer and its rate of buildup on the anode surface can render the passivation layer deleterious and thereby adversely affect cell performance. However, it has been determined that the rate of buildup of the anode passivation can be retarded and the passivation layer stabilized by employing certain electrolyte systems for the $Li/FeS_2$ cell. This includes considering specific solvent mixtures in combination with specific lithium salts as well as including additives to the electrolyte. It is thus possible to produce a passivation layer on the lithium anode for the $Li/FeS_2$ cell which does not significantly compromise cell performance.

The cathode material may be initially prepared in the form of a slurry mixture, which can be readily coated onto a substrate, typically a metal substrate, by conventional coating methods. The electrolyte added to the cell is a suitable electrolyte for the $Li/FeS_2$ system allowing the necessary electrochemical reactions to occur efficiently over the range of high power output desired. The electrolyte must exhibit good ionic conductivity and also be sufficiently stable, that is non reactive, with the undischarged or partially discharged electrode materials (anode and cathode components) and also non reactive with the discharge products. This is because undesirable oxidation/reduction reactions between the electrolyte and electrode materials (either discharged or undischarged or partially discharged) could gradually contaminate the electrolyte and reduce its effectiveness or result in excessive gassing. This in turn can result in a cell failure. Thus, the electrolyte used in a $Li/FeS_2$ cell in addition to promoting the necessary electrochemical reactions, should also be stable in contact with discharged, partially discharged and undischarged electrode materials. The electrolyte solvent should enable good ionic mobility and transport of the lithium ion ($Li^+$) from anode to cathode so that it can engage in the necessary reduction reaction resulting in $Li_2S$ product in the cathode.

Primary lithium cells are in use as a power source for digital flash cameras, which require operation at higher pulsed power demands than is supplied by individual alkaline cells. Primary lithium cells are conventionally formed of an electrode composite comprising an anode formed of a sheet of lithium (or lithium alloy, essentially of lithium), a cathode formed of a coating of cathode active material comprising $FeS_2$ on a conductive metal substrate (cathode substrate) and a sheet of electrolyte permeable separator material therebetween. A microporous polypropylene separator for a lithium cell is disclosed, for example, in U.S. Pat. No. 4,794,057. The electrode composite may be spirally wound and inserted into the cell casing, for examples, as shown in U.S. Pat. No. 4,707,421.

A portion of the spiral wound anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The anode in a Li/FeS$_2$ cell can be formed by laminating a layer of lithium metal or lithium alloy on a metallic substrate such as copper. However, the anode may be formed of a sheet of lithium or lithium alloy without any substrate.

The electrolyte used in primary Li/FeS$_2$ cells is formed of a "lithium salt" dissolved in an "organic solvent". The electrolyte must promote ionization of the lithium salt and provide for good ionic mobility of the lithium ions so that the lithium ions may pass at good transport rate from anode to cathode through the separator. Representative lithium salts which may be used in electrolytes for Li/FeS$_2$ primary cells are referenced in U.S. Pat. Nos. 5,290,414 and 6,849,360 B2 and include such salts as: Lithium trifluoromethanesulfonate, LiCF$_3$SO$_3$ (LiTFS); lithium bistrifluoromethylsulfonyl imide, Li (CF$_3$SO$_2$)$_2$N (LiTFSI); lithium iodide, LiI; lithium bromide, LiBr; lithium tetrafluoroborate, LiBF$_4$; lithium hexafluorophosphate, LiPF$_6$; lithium hexafluoroarsenate, LiAsF$_6$; lithium methide, Li(CF$_3$SO$_2$)$_3$C; lithium perchlorate LiClO$_4$; lithium bis(oxalato)borate, LiBOB and various mixtures. In the art of Li/FeS$_2$ electrochemistry lithium salts are not always interchangeable as specific salts work best with specific electrolyte solvent mixtures.

In U.S. Pat. No. 5,290,414 (Marple) is reported use of a beneficial electrolyte for FeS$_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol. % dimethoxyethane (DME) (col. 7, lines 47-54). A specific lithium salt ionizable in such solvent mixture(s), as given in the example, is lithium trifluoromethane sulfonate, LiCF$_3$SO$_3$. Another lithium salt, namely lithium bistrifluoromethylsulfonyl imide, Li(CF$_3$SO$_2$)$_2$N is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed a specific preferred electrolyte for an Li/FeS$_2$ cell, wherein the electrolyte comprises the salt lithium iodide dissolved in the organic solvent mixture comprising 1,3-dioxolane (DX) (63.05 wt %), 1,2-dimethoxyethane (DME) (27.63 wt %), and small amount of 3,5 dimethylisoxazole (DMI) (0.18 Wt %). (col. 6, lines 44-48) The electrolyte is typically added to the cell after the dry anode/cathode spiral with separator therebetween is inserted into the cell casing.

In US 2007/0202409 A1 (Yamakawa) it is stated with reference to the electrolyte solvent for the Li/FeS$_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the Li/FeS$_2$ cell depending on the particular lithium salt to be dissolved in the solvent. (See, e.g. above U.S. Pat. Nos. 5,290,414 and 6,849,360) The reference Yamakawa does not teach which combination of solvents from the above list are to be used with any given lithium salt.

Conventional FeS$_2$ powders, for example Pyrox Red 325 powder from Chemetall GmbH, are conventionally available with pH raising additives therein to offset or retard any buildup in acidity of the powder. Such additives are believed to contain calcium carbonate (CaCO$_3$) or calcium carbonate linked to other compounds. Such calcium carbonate is added to the FeS$_2$ powder to retard the formation of acidic impurities within or on the surface of the powder as it is stored in ambient air and exposed to oxygen and moisture. This is regardless of whether the FeS$_2$ is intended for use in cathode mixtures or other applications, for example, as an additive in manufacture of car brakes.

It is desired to find an electrolyte for the Li/FeS$_2$ cell which improves ionic mobility of the lithium ions passing from anode to cathode and thus enhances cell performance and rate capability.

It is desired to find additives for the electrolyte which reduces the chance of polymerization of the electrolyte solvents and also retards the rate of buildup of deleterious passivation layer on the lithium anode.

It is desired to produce a primary (nonrechargeable) Li/FeS$_2$ cell having good rate capability that the cell may be used in place of rechargeable batteries to power digital cameras.

SUMMARY OF THE INVENTION

The present invention is directed to a primary electrochemical cell having an anode comprising lithium or lithium alloy as anode active material and a cathode comprising iron disulfide (FeS$_2$) as cathode active material. The anode and cathode are typically spirally wound with a separator sheet therebetween to form an electrode assembly. An electrolyte solution is added to the cell after the wound electrode assembly is inserted into the cell casing. The electrolyte typically comprises a lithium salt dissolved in an organic solvent mixture. A preferred electrolyte solution comprises a mixture of lithium iodide (LiI) salt dissolved in a mixture of dioxolane (DX), dimethoxyethane (DME), and sulfolane. The dioxolane is preferably 1,3-dioxolane. It shall be understood that the term dioxolane may include alkyl substituted dioxolanes. The preferred dimethoxyethane is 1,2-dimethoxyethane. Although sulfolane is distinctly preferred, other solvents with similarly high dielectric constant can be employed in place of sulfolane. Such solvents are propylene carbonate, ethylene carbonate, 3-methyl-2-oxazolidone, γ-butyrolactone, dimethylsulfoxide, dimethylsulfite, ethylene glycol sulfite, acetonitrile, N-methylpyrrolidinone or combinations thereof.

In a principal aspect the electrolyte formulation of the invention for a Li/FeS$_2$ cell comprises a lithium iodide salt dissolved in a solvent mixture comprising dioxolane, dimethyoxyethane, and sulfolane, wherein the weight ratio of dioxolane to dimethoxyethane is in a range between about 0.82 and 9.0, desirably between about 0.82 and 2.3. The dioxolane is preferably 1,3-dioxolane but may include alkyl substituted dioxolanes as well. The preferred dimethoxyethane is 1,2-dimethoxyethane, but other glymes also can be employed. The sulfolane content in the electrolyte formulation of the invention preferably comprises greater than about 4.8 wt % of the solvent mixture. Preferably, the sulfolane comprises between about 4.8 and 6.0 wt % of the solvent mixture. However, the sulfolane may also be present in higher amount, for example, up to about 25 wt % of the above indicated solvent mixture wherein the weight ratio of dioxolane to dimethoxyethane is in a range between about 0.82 and 9.0. The electrolyte also optionally includes 3,5-dimethylisoxazole (DMI) in amount between about 0.1 and 1 wt. % of the solvent mixture. (The dimethylisoxazole similar to other Lewis bases is helpful in retarding polymerization of dioxolane.) The lithium iodide is typically present in the solvent mixture at a concentration of about 0.8 moles per liter. The electrolyte has a viscosity desirably between about 0.9 and 1.5 centipoise.

The water content in the electrolyte of the invention for the $Li/FeS_2$ cell may typically be less than about 100 parts water per million parts total electrolyte. However, based on favorable test results reported herein utilizing the electrolyte formulation of the invention, water content in the total electrolyte may be greater than 100 ppm. Also it is believed that water (deionized) may be added to the electrolyte solvents so that the water content in the electrolyte for the $Li/FeS_2$ cell may be up to about 1000 ppm and even up to about 2000 ppm. (See commonly assigned patent application Ser. No. 12/009,858, Filed Jan. 23, 2008.) Thus it is believed that the water content in the electrolyte of the present invention may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte is between about 100 and 300 ppm.

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. The cell has a cathode comprising the cathode active material iron disulfide ($FeS_2$), commonly known as "pyrite". The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide ($FeS_2$) and carbon particles onto a substrate, preferably a conductive metal substrate. The $FeS_2$ and carbon particles are bound to the substrate using desirably an elastomer, preferably, a styrene-ethylene/butylene-styrene (SEBS) block copolymer such as Kraton G1651 elastomer (Kraton Polymers, Houston, Tex.). This polymer is a film-former, and possesses good affinity and cohesive properties for the $FeS_2$ particles as well as for conductive carbon particle additives in the cathode mixture. The polymer resists chemical attack by the electrolyte.

The cathode is formed from a cathode slurry comprising iron disulfide ($FeS_2$) powder, conductive carbon particles, binder material, and solvent. (The term "slurry" as used herein will have its ordinary dictionary meaning and thus be understood to mean a wet mixture comprising solid particles.) The wet cathode slurry is coated onto a substrate which is preferably conductive such as a sheet of aluminum or stainless steel. The substrate functions as a cathode current collector. The solvent is then evaporated leaving a cathode composite formed of a dry cathode coating mixture comprising the iron disulfide material and carbon particles preferably including carbon black adhesively bound to each other and with the dry coating bound, preferably to the both sides of the substrate. An electrode assembly is then formed comprising a sheet of lithium or lithium alloy, the cathode composite sheet, and separator therebetween. The electrode assembly is preferably spirally wound and inserted into the cell casing. The electrolyte solution is then poured into the cell casing and the cell crimped closed over an end cap.

A predischarge (limited drain) protocol can be beneficially applied to the $Li/FeS_2$ cell. Such protocol is preferably applied within 24 hours (one day) from the time the fresh cell is made. It has been determined that a pulsed type predischarge protocol can reduce the passive layer resistance on the anode, that is, can retard the rate of buildup of deleterious passive layer on the anode, thus improving cell performance. This beneficial result can be manifested in particular when the cell contains the above indicated electrolyte system with water content between about 100 and 2000 ppm, for example, between about 600 and 2000 ppm, or between about 600 and 1000 ppm, preferably between about 100 and 300 ppm.

The predischarge protocol as applied to an AA size cylindrical $Li/FeS_2$ cell with wound electrode assembly is as follows:

Apply at least two pulsed cycles in sequence, wherein each pulsed cycle comprises:

i) applying a current drain of between about 1 and 3 Amp to the cell for a period of between about 2 and 20 seconds; and ii) resting the cell for a duration of between about 10 and 100 seconds before the next current drain.

Preferably, the current drain applied in each pulsed cycle is between about 1.5 and 2.5 Amp. The number of pulsed cycles applied in sequence can be between about 2 and 100, preferably between about 20 and 40. The total capacity (mAmp-hrs) removed by this presdischarge protocol is between 2 and 10 percent of the cell's initial capacity.

DETAILED DESCRIPTION

Figure 1:
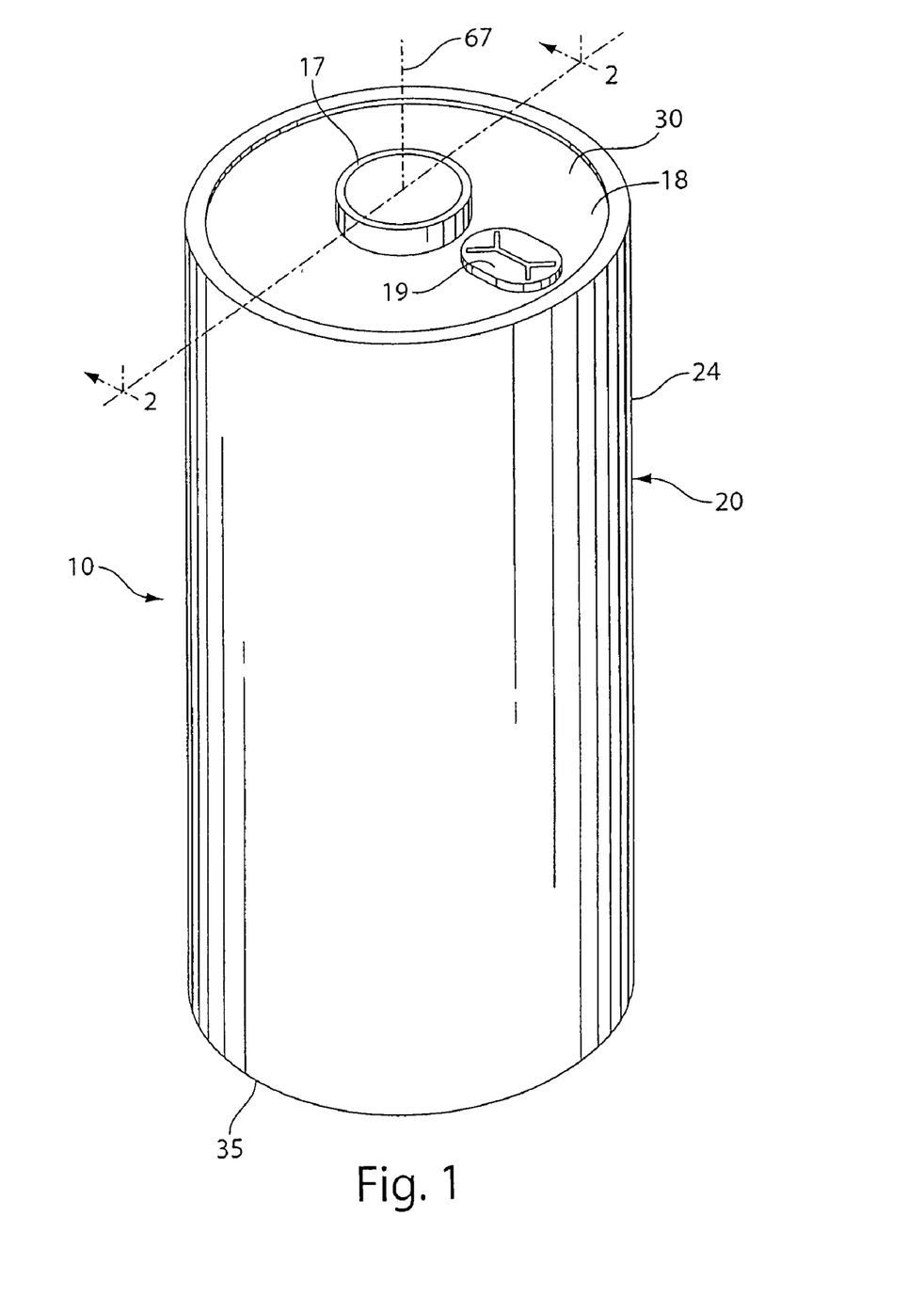
FIG. 1 is an isometric view of an improved $Li/FeS_2$ cell of the invention as presented in a cylindrical cell embodiment.

The $Li/FeS_2$ cell of the invention may be in the form of a flat button cell 100 or a spirally wound cell 10. A button (coin) cell 100 configuration for use as a testing cell comprises a lithium anode 150 and a cathode 170 comprising iron disulfide (FeS$_2$) with separator 160 therebetween is shown in the FIG. 1A.

Figure 1A:
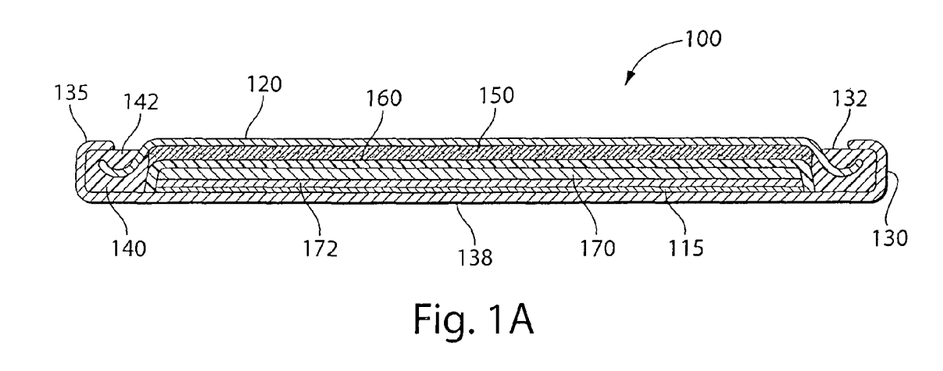
FIG. 1A is a cross sectional view of an improved $Li/FeS_2$ cell of the invention as presented in a button cell embodiment.

The Li/FeS$_2$ cell as in cell 100 has the following basic discharge reactions (one step mechanism):

Anode:

$$4Li = 4Li^+ + 4e^-$$  Eq. 1

Cathode:

$$FeS_2 + 4Li^+ + 4e^- = Fe + 2Li_2S$$  Eq. 2

Overall:

$$FeS_2 + 4Li = Fe + 2Li_2S$$  Eq. 3

Description of Button Cell

The Li/FeS$_2$ button cell 100 shown in FIG. 1A was used as the experimental testing vehicle and may be in the form of a primary (nonrechargeable) cell. By "nonrechargeable" is meant that the cell is intended to be discarded after it has been discharged. In the button cell 100 (FIG. 1A) a disk-shaped cylindrical cathode housing 130 is formed having an open end 132 and a closed end 138. Cathode housing 130 is preferably formed from nickel-plated steel. An electrical insulating member 140, preferably a plastic cylindrical member having a hollow core, is inserted into housing 130 so that the outside surface of insulating member 140 abuts and lines the inside surface of housing 130. Alternatively, the inside surface of housing 130 may be coated with a polymeric material that solidifies into insulator 140 abutting the inside surface of housing 130. Insulator 140 can be formed from a variety of thermally stable insulating materials, for example polypropylene.

A cathode current collector 115 comprising a metallic grid can be inserted into the cell so that it abuts the inside surface of the closed end 138 of the housing 130. The cathode current collector 115 may desirably be composed of a sheet of expanded stainless steel metal foil, having a plurality of openings therein, thus forming a stainless steel grid or screen. The expanded stainless steel metal foil is available as EXMET foil 316L-SS from Dexmet Corp. Preferably, however, the cathode current collector 115 is composed of a sheet of aluminum, which is more conductive. (The cathode current collector 115 may be a sheet of aluminum alloyed with common aluminum alloy metals such as magnesium, copper, and zinc.) Such aluminum current collector sheet 115 may also have a plurality of small openings therein, thus forming an aluminum grid. The cathode current collector 115 can be welded onto the inside surface of the closed end 138 of the housing 130. (Optionally, the same type of current collector grid, preferably of expanded stainless steel metal foil with openings therein, may be welded to the inside surface of the closed end of the anode cover 120.) An optional conductive carbon base layer 172 comprising a mixture of graphite and polytetrafluoroethylene (PTFE) binder can be compressed into the cathode current collector 115. The cathode material 170 comprising the FeS$_2$ active particles may then be pressed into such conductive base layer 172. This may be termed a "staged" cathode construction.

The cathode material 170 comprising iron disulfide (FeS$_2$) or any mixture including iron disulfide (FeS$_2$) as active cathode material, may thus be inserted over optional conductive base layer 172 so that it overlies current collector sheet 115. The cathode active material, that is, the material undergoing useful electrochemical reactions, in cathode layer 170 can be composed entirely of iron disulfide (FeS$_2$). The cathode 170 comprising iron disulfide (FeS$_2$) powder dispersed therein can be prepared in the form of a slurry which may be coated on both sides of a conductive metal foil, preferably an aluminum or stainless steel foil. Such aluminum or stainless steel foil may have openings therethrough, thus forming a grid or screen. Alternatively, the cathode 170 comprising iron disulfide (FeS$_2$) powder dispersed therein can be prepared in the form of a slurry which is coated on just the side of an aluminum or stainless steel foil facing separator 160. In either case a conductive base layer 172, as above described, may be employed in which case cathode 170 is inserted in the cell so that it overlies conductive base layer 172 as shown in FIG. 1A.

Alternatively, the cathode 170 comprising iron disulfide (FeS$_2$) powder dispersed therein can be prepared in the form of a slurry which may be coated directly onto a conductive substrate sheet 115 to form a cathode composite. Preferably conductive substrate sheet 115 is formed of a sheet of aluminum (or aluminum alloy), as above described, and may have a plurality of small apertures therein, thus forming a grid. Alternatively, the conductive substrate sheet 115 may be a sheet of stainless steel, desirably in the form of expanded stainless steel metal foil, having a plurality of small apertures therein.

The cathode slurry comprises 2 to 4 wt % of binder (Kraton G1651 elastomeric binder from Kraton Polymers, Houston Tex.); 50 to 70 wt % of active FeS$_2$ powder; 4 to 7 wt % of conductive carbon (carbon black and graphite); and 25 to 40 wt % of solvent(s). (The carbon black may include in whole or in part acetylene black carbon particles. Thus, the term carbon black as used herein shall be understood to extend to and include carbon black and acetylene black carbon particles.) The Kraton G1651 binder is an elastomeric block copolymer (styrene-ethylene/butylene (SEBS) block copolymer) which is a film-former. This binder possesses sufficient affinity for the active FeS$_2$ and carbon black particles to facilitate preparation of the wet cathode slurry and to keep these particles in contact with each other after the solvents are evaporated. The FeS$_2$ powder may have an average particle size between about 1 and 100 micron, desirably between about 10 and 50 micron. A desirable FeS$_2$ powder is available under the trade designation Pyrox Red 325 powder from Chemetall GmbH, wherein the FeS$_2$ powder has a particle size sufficiently small that of particles will pass through a sieve of Tyler mesh size 325 (sieve openings of 0.045 mm). (The residue amount of FeS$_2$ particles not passing through the 325 mesh sieve is 10% max.) The graphite is available under the trade designation Timrex KS6 graphite from Timcal Ltd. Timrex graphite is a highly crystalline synthetic graphite. (Other graphites may be employed selected from natural, synthetic, or expanded graphite and mixtures thereof, but the Timrex graphite is preferred because of its high purity.) The carbon black is available under the trade designation Super P conductive carbon black (BET surface area of 62 m$^2$/g) from Timcal Co.

The solvents preferably include a mixture of C$_9$-C$_{11}$ (predominately C$_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as ShellSol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily C$_9$ to C$_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders are first blended to ensure uniformity before being added to the binder solution in the mixing bowl.

A preferred cathode slurry mixture is presented in Table 1:

TABLE I

Cathode Composition

| | Wet Cathode Slurry (wt. %) | Dry Cathode (wt. %) |
|---|---|---|
| Binder (Kraton G1651) | 2.0 | 3.01 |
| Hydrocarbon Solvent (ShellSol A100) | 13.4 | 0.0 |
| (ShellSol OMS) | 20.2 | 0.0 |
| $FeS_2$ Powder (Pyrox Red 325) | 58.9 | 88.71 |
| Graphite (Timrex KS6) | 4.0 | 6.02 |
| Acetylene Carbon Black (Super P) | 1.5 | 2.26 |
| Total | 100.0 | 100.00 |

The wet cathode slurry 170 is applied to the current collector 115 using intermittent roll coating technique. This same or similar wet cathode slurry mixture (electrolyte not yet added to the cell) is disclosed in commonly assigned application Ser. No. 11/516,534, filed Sep. 6, 2006. The total solids content of the wet cathode slurry mixture 170 as shown in above Table 1 is 66.4 wt. %. Thus, the acetylene black content in the dry cathode would be 2.26 wt. % and the graphite content in the dry cathode would be 6.02 wt. %.

As above indicated current collector sheet 115 is optionally precoated with a carbon base layer 172 before the wet cathode slurry is applied. The cathode slurry coated on the metal substrate 115 is dried gradually adjusting or ramping up the temperature from an initial temperature of 40° C. to a final temperature of about 130° C. in an oven until the solvent has all evaporated. (Drying the cathode slurry in this manner avoids cracking.) This forms a dry cathode coating 170 comprising $FeS_2$, carbon particles, and binder on the metal substrate 115. The coated cathode is then passed between calendering rolls to obtain the desired cathode thicknesses. A representative desirable thickness of dry cathode coating 170 is between about 0.172 and 0.188 mm, preferably about 0.176 mm. The dry cathode coating 170 thus has the following desirable formulation: $FeS_2$ powder (89 wt. %); Binder (Kraton G1651), 3 wt. %; Graphite (Timrex KS6), 6 wt. %, and Carbon Black (Super P), 2 wt %. The carbon black (Super P carbon black) develops a carbon network which improves conductivity.

The cathode composite comprising current collector sheet 115, cathode base layer 172, and dry cathode coating 170 thereon may then be inserted into cathode housing 130. A separator sheet 160 preferably comprising a microporous polypropylene may then be inserted over the cathode coating 170.

The electrolyte for the $Li/FeS_2$ cell may then be added so that it fully penetrates through separator sheet 160 and cathode layer 170. An electrolyte mixture can be added so that it becomes absorbed into the separator and cathode coating. The electrolyte comprises a lithium salt or mixture of lithium salts dissolved in an organic solvent. The electrolyte mixture is desirably added on the basis of about 0.4 gram electrolyte solution per gram $FeS_2$ facing the anode.

The electrolyte of the invention for the above cell comprises a lithium iodide salt dissolved in a solvent mixture comprising dioxolane, dimethyoxyethane, and sulfolane, wherein the weight ratio of dioxolane to dimethoxyethane is in a range between about 0.82 and 9.0, desirably between about 0.82 and 2.3. The dioxolane is preferably 1,3-dioxolane but may include alkyl-substituted dioxolanes as well. The preferred dimethoxyethane is 1,2-dimethoxyethane. The sulfolane preferably comprises greater than about 4.8 wt % of the solvent mixture. Preferably, the sulfolane comprises between about 4.8 and 6.0 wt % of the solvent mixture. The electrolyte has a viscosity desirably between about 0.9 and 1.5 centipoise.

A layer of anode material 150, typically a sheet of lithium or lithium alloy may then be placed over separator sheet 160. The anode cover 120, formed preferably from nickel-plated steel, is inserted into open end 132 of housing 130 and peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and housing 130 at the closed end 138 functions as the positive terminal of the cell.

EXAMPLE

Experimental Test Lithium Button Cells with Cathode Comprising $FeS_2$

Experimental test $Li/FeS_2$ coin cells 100 (FIG. 1A) were prepared as follows:
Experimental Test Cell Assembly:

A coin shaped cathode housing 130 of nickel plated steel and a coin shaped anode housing (cover) 120 of nickel plated steel is formed of a similar configuration shown in FIG. 1A. The finished cell 100 had an overall diameter of about 25 mm and a thickness of about 3 mm. The weight of $FeS_2$ in the cathode housing 130 was about 0.13 g which covers both sides of the aluminum substrate sheet 115. Because in this test cell 100 only the cathode side of the aluminum substrate sheet 115 facing the anode is dischargeable, then the amount active $FeS_2$, that is, the amount which is actually dischargeable, is about 0.065 g. The lithium was in theoretical capacity excess in relation to the cathode.

In forming each cell 100, an Arbor press with a 0.780-inch die was used to punch out two stainless steel grids (316L-SS EXMET expanded metal foil). One stainless steel grid was centered inside of coin cell cathode housing 130 forming cathode current collector sheet 115. The other stainless steel grid (not shown) was resistance welded to the inside surface of closed end of the anode housing (cover) 120. The grids were welded to their respective housings using a Hughes opposing tip tweezers welder. The welder was set at 20 watts-seconds and a medium pulse. The welds that were formed were evenly spaced around the perimeters of the grids over intersecting points of mesh strands. For each cell, six to eight welds were formed per grid.

A plastic insulating disk (grommet) 140 was then attached to the edge of anode cover 120 (FIG. 1A). A lithium disk 150 formed of a sheet of lithium metal having a thickness of 0.032 inch (0.813 mm) was punched out in a dry box using an Arbor press and a 0.75 inch diameter hand punch. The lithium disk 150 forming the cell's anode was then pressed onto the stainless steel grid against the inside surface of the closed end of anode cover 120 using an Arbor press.

A microporous polypropylene separator 160 (Celgard CG2400 separator from Celgard, Inc.) was cut into eight-inch strips and punched out using a hand punch having a diameter of 0.9375 inch and set aside.

Cathode conductive base layer 172 was prepared as follows:

Add 75 g of graphite (Timrex KS6 graphite) and 25 g of tetrafluoroethylene (Teflon) powder to a tumbler (with weights) and let run overnight in hood. Add contents to a blender (~10 g at a time) and blend on high for 1 minute. Pour blended contents into a container, label, and store until ready for use. When ready for application of cathode base layer 172, the cathode housing 130 was placed in a die. The cathode base layer 172 (0.500 g) was impacted onto a stainless steel grid 115 by using a ram connected to a Carver hydraulic press. The cathode base layer 172 had the composition 75 wt. % graphite and 25% Teflon powder.

A cathode slurry was then prepared and coated over one side of an aluminum sheet (not shown). The components of the cathode slurry comprising iron disulfide ($FeS_2$) were mixed together in the following proportion:

$FeS_2$ powder (58.9 wt. %); Binder, styrene-ethylene/butylene-styrene elastomer (Kraton G1651) (2 wt. %); Graphite (Timrex KS6) (4.0 wt %), Carbon Black (Super P carbon black) (1.5 wt %), Hydrocarbon Solvents, ShellSol A100 solvent (13.4 wt %) and ShellSol OMS solvent (20.2 wt %).

The wet cathode slurry on the aluminum sheet (not shown) was then dried in an oven between 40° C. and 130° C. until the solvent in the cathode slurry all evaporated, thus forming a dry cathode coating 170 comprising $FeS_2$, conductive carbon and elastomeric binder on a side of the aluminum sheet. The aluminum sheet carrying cathode coating 170 was an aluminum foil of 20 micron thickness. The same composition of wet cathode slurry was then coated onto the opposite side of the aluminum sheet and similarly dried. The dried cathode coatings on each side of the aluminum sheet was calendered to form a dry cathode 170 having a total final thickness of about 0.176 mm, which includes the 20 micron thick aluminum foil. The dry cathode coating 170 had the following composition:

$FeS_2$ powder (88.71 wt. %); Binder Kraton G1651 elastomer (3.01 wt. %); conductive carbon particles, graphite Timrex KS6 (6.02 wt. %) and carbon black, Super P (2.26 wt %).

The composite of the dry cathode coating 170 coated on both sides of the aluminum sheet was then die punched into the cathode housing 130 onto carbon base layer 172. This was done by placing cathode housing 130 within a die. A cut to size composite of aluminum sheet coated on both sides with dry cathode coating 170 was then aligned directly over cathode base layer 172 within housing 130. A ram was then inserted into the die holding housing 130, and the die was moved to a hydraulic press. Four metric tons of force was applied using the press to punch the composite into the cathode housing 130 so that it was impacted against cathode base layer 172. The die was then inverted and the housing 130 gently removed from the die. The surface of the exposed cathode layer 170 had a smooth, consistent texture. The finished cathode coin was then placed in a vacuum oven and was heated at 150° C. for 16 hours.

Experimental Data

Experiment 1:

A Control Cell Group and Test Cell Group of button (coin) cells 100 were made as described above. The control group of cells had the following electrolyte:

Control Cell Group with Control Electrolyte:

Lithium bistrifluoromethylsulfonyl imide, $Li(CF_3SO_2)_2N$ referenced herein as LiTFSI, yielding a concentration of 0.8 moles/liter was dissolved in a solvent mixture comprising 1,3-dioxolane (DX) (80 vol %), sulfolane (20 vol %), and pyridine (PY) 800 ppm. The electrolyte contained less than 50 parts by weight water per million parts by weight (ppm) electrolyte.

The cells of first test group, that is, Test Cell Group I were identical (including the control cells) in construction and anode/cathode composition (coin cells 100) except that different electrolyte formulation was used in Test Cell Group I compared to the Control Cell Group. The Test Cell Group I of coin cells 100 had the following different electrolyte formulation of the invention:

Test Cell Group I with Electrolyte Formulation I:

Electrolyte Formulation I: Lithium iodide (LiI) yielding a concentration of 0.8 moles/liter was dissolved in a solvent mixture comprising 1,3-dioxolane (DX) (42.6 wt %), 1,2-dimethoxyethane (DME) (52.1 wt %), and sulfolane (5.3 wt %). The solvent mixture also contained 3,5-dimethylisoxazole (DMI) (0.2 wt %). The cells were made with water content in the total electrolyte of about 120 parts by weight water per million parts by weight electrolyte (ppm) as a result of adding deionized water to the solvent mixture.

The cells of second test group, namely Test Cell Group II were identical to Test Cell Group I and the Control cells except that different electrolyte formulation was used in Test Cell Group II. The Test Cell Group II was made with the following different electrolyte formulation of the invention:

Test Cell Group II With Electrolyte Formulation II:

Electrolyte Formulation II: Lithium iodide (LiI) yielding a concentration of 0.8 moles/liter was dissolved in a solvent mixture comprising 1,3-dioxolane (DX) (66.5 wt %), 1,2-dimethoxyethane (DME) (28.5 wt %), and sulfolane (5.0 wt %). The solvent mixture also contained 3,5-dimethylisoxazole (DMI) (0.2 wt %). The cells were made with water content in the total electrolyte of about 270 parts by weight water per million parts by weight electrolyte (ppm) by adding deionized water to the solvent mixture.

Experiment 2:

Cells were made with Electrolyte Formulation for Control Cell Group and Test Cell Group Identical to Electrolyte Formulation 1 in Experiment #1:

Thus, the electrolyte for all cells, that is Control Cells and Test Cell Group in Experiment 2 was: Lithium iodide (LiI) yielding a concentration of 0.8 moles/liter was dissolved in a solvent mixture comprising 1,3-dioxolane (DX) (42.6 wt %), 1,2-dimethoxyethane (DME) (52.1 wt %), and sulfolane (5.3 wt %). The solvent mixture also contained 3,5-dimethylisoxazole (DMI) (0.2 wt %). The cells were made with water content in the total electrolyte of about 120 ppm by adding deionized water to the solvent mixture.

Predischarge Protocol

Predischarge (Limited Drain) Protocol for Experiment #1 Cells (Control Group Cells, Test Cell Group I, and Test Cell Group II):

All fresh cells for Experiment #1, that is, the Control Cell Group, Test Cell Group I and Test Cell Group II of Experiment #1 were subjected to the following predischarge schedule. The predischarged schedule was a series 27 discharge pulse cycles, where each pulse cycle consisted of a pulse at 35 mAmp for 7 seconds, followed by an intermittent pulse rest of 22 seconds. This predischarge schedule was applied within about one day after the fresh coin cells 100 was made. Thus, the term "predischarge protocol" as it is used herein is a limited drain protocol which is applied to the cell soon after the fresh cell is made, namely, within about one day after the cell is made. Thus the predischarge (limited drain) protocol is applied within about one day after the fresh cell is made and before the cell is made available for commercial usage.

Predischarge (Limited Drain) Protocol for Experiment #2 Control Group of Cells:

Fresh control cells were predischarged per schedule described above: This predischarge schedule was a series 27 discharge pulse cycles, where each pulse cycle consisted of a pulse at 35 mAmp for 7 seconds, followed by an intermittent pulse rest of 22 seconds. This predischarge schedule was applied within about one day after the fresh coin cells 100 was made.

Predischarge (Limited Drain) Protocol for Experiment #2 Test Cell Group:

Fresh Test Cells of Experiment #2 were predischarged by constant current of 0.6 mAmp for 3 hours to remove about the same capacity (mAmp-hrs) as was removed by pulse predischarge schedule for the control cells. This predischarge schedule was applied within about one day after the fresh coin cells 100 was made.

Accelerated Storage

After subjecting fresh cells to the above indicated respective predischarge protocols, each of the cell groups, namely, the Control Cell Group of Experiment #1, and Control Cell Group of Experiment #2 as well as all Test Cells for Experiment #1 and all Test Cells of Experiment #2 were subjected to accelerated storage (5 days at 60° C.).

Impedance Measurements

The Control Cell Group and Test Cell Group of Experiment #2 after accelerated storage were subjected to complex impedance measurements. Both control cells and test cells had same electrolyte as above indicated in description of Experiment #2, namely:

Lithium iodide (LiI) yielding a concentration of 0.8 moles/liter was dissolved in a solvent mixture comprising 1,3-dioxolane (DX) (42.6 wt %), 1,2-dimethoxyethane (DME) (52.1 wt %), and sulfolane (5.3 wt %). The solvent mixture also contained 3,5-dimethylisoxazole (DMI) (0.2 wt %). The cells were made with water content in the total electrolyte greater than 100 parts by weight water per million parts by weight electrolyte (ppm).

Complex impedance of each coin cell was measured by using Solartron Electrochemical Interface 1287 with Frequency Response Analyzer 1255. This measurement allows the calculation of the resistance of the lithium passive layer. The cell's impedance reflects the internal resistance of the cell and thus the resistance of the lithium passivation layer.

Digital Camera Accelerated Simulation Test

All the cells as described in above Experiments 1 and 2 were subjected to the digital camera accelerated simulation test which consisted of the following pulsed test protocol: Each pulsed cycle consisted of: 2 intermediate cycles consisting of both a 26 milliWatt pulse for 2 seconds followed immediately by a 12 milliwatt pulse for 28 seconds. These pulsed cycles were repeated until a cut off voltage of 1.05 Volt is reached.

Discharge of the cells was performed on Maccor 4000 cycling equipment. The cells were discharged to the same cut off voltage of 1.05 volts using the above indicated digital camera accelerated simulation discharge test. The test results are reported as follows:

Results of Digital Camera Simulation Test

Experiment #1 Cells—Digital Camera Simulation Test

The following are the mean average pulsed cycles achieved for the Experiment #1 Control Cell Group, Test Cell Group I and Test Cell Group II as the cells were discharged to 1.05 with the above described digital camera simulation test. These cells were all discharged after being subjected to above described predischarge and accelerated storage protocols for the Experiment #1 cells. (Each cell group was made up of about 5 to 7 cells.)

Control Cell Group: 540.7 pulsed cycles (mean average) to 1.05 Volt cut off.

Test Cell Group I: 582.8 pulsed cycles (mean average) to 1.05 Volt cut off.

Test Cell Group II: 569.4 pulsed cycles (mean average) to 1.05 Volt cut off.

Experiment #2 Cells—Digital Camera Simulation Test

The following are the mean average pulsed cycles achieved for the Experiment #2 Control Cell Group and Test Cell Group as the cells were discharged to 1.05 with the above described digital camera simulation test. These cells were all discharged after being subjected to above described predischarge and accelerated storage protocols for the Experiment #2 cells. (Each cell group was made up of 6 to 7 cells.)

Control Cell Group: 582.8 pulsed cycles (mean average) to 1.05 Volt cut off.

Test Cell Group: 555.6 pulsed cycles (mean average) to 1.05 Volt cut off.

Experiment #2—Cell Impedance Measurements (Resistance of Anode Passive Layer)

Resistance of the lithium anode passive layer is reflected by the cell impedance measurements, which is a measure of the cell's internal resistance. The cell impedance was recorded as follows for the Experiment #2 cells:

Control Cell Group: Impedance—Resistance of Anode Passive Layer: 5.8 Ohms (mean impedance); number of pulsed cycles in digital camera accelerated simulation discharge test 582.8 (mean average) to 1.05 V cut off.

Test Cell Group: Impedance—Resistance of Anode Passive Layer for Test Cell Group 24.8 Ohms; number of pulsed cycles in digital camera accelerated simulation discharge test 555.6 to 1.05 V cut off.

Conclusions Drawn from Test Results

In Experiment #1 the test results indicate better discharge performance (accelerated discharge simulation test) for the Test Cell Groups I and II compared to the Control Cell Group. As above indicated the Control Cell Group as well as both Test Cell Groups I and II were subjected to the same predischarge (limited drain) protocol and same accelerated storage protocol. The mean pulsed cycles for Test Cell Group I and Test Cell Group II were 582.8 pulsed cycles and 569.4 pulsed cycles to 1.05 volt cutoff compared to the Control Cell Group which had a mean of 540.7 pulsed cycles to 1.05 volt cutoff. Both test cell groups (Test Cell Group I and II) had high water content in the electrolyte, namely greater than 100 ppm water in the electrolyte compared to the control cells which had less than 50 ppm water. Nevertheless, the test cells showed better discharge performance than the control cells as the cells were subjected to the accelerated discharge simulation test.

Thus, it would appear that the electrolyte formulation in Test Cell Groups I and II in Experiment #1, namely, Electrolyte Formulation I and Electrolyte Formulation II, respectively was a more effective electrolyte than the control electrolyte.

The Electrolyte Formulation I was as follows: Lithium iodide (LiI) yielding a concentration of 0.8 moles/liter dissolved in a solvent mixture comprising 1,3-dioxolane (DX) (42.6 wt %), 1,2-dimethoxyethane (DME) (52.1 wt %), and sulfolane (5.3 wt %). The solvent mixture also contained 3,5-dimethylisoxazole (DMI) (0.2 wt %). The Electrolyte Formulation II comprised 1,3-dioxolane (DX) (66.5 wt %), 1,2-dimethoxyethane (DME) (28.5 wt %) and sulfolane (5.0 wt %). The solvent mixture also contained 3,5-dimethylisoxazole (DMI) (0.2 wt %). The Electrolyte Formulations I and II also contained greater than 100 parts by weight water per million parts by weight electrolyte (ppm). Specifically, deionized water was added to the electrolyte Formulations I and II so that the water content in Electrolyte Formulation I was 120 ppm water and the water content in Electrolyte Formulation II was 270 ppm water. By contrast the electrolyte in the control cells was comprised of a mixture of LiTFSI salt dissolved in a solvent mixture comprising 1,3-dioxolane (DX) and sulfolane with less than 50 ppm water present. The above electrolyte formulation I and II comprising 1,3-dioxolane (DX) (42-67 wt %), 1,2-dimethoxyethane (DME) (28-52 wt %), and sulfolane (5-6 wt %) may be more effective as a result of better mass transport properties of the electrolyte mixture as a whole. It is possible that the added water in these electrolyte formulations resulting in a water content of greater than 100 ppm water may also be contributing to the improved conductivity of the electrolyte, thereby, helping to achieve the better cell discharge performance.

In Experiment #2 the electrolyte in both control cell group and test cell group were the same, namely, lithium iodide (LiI) yielding a concentration of 0.8 moles/liter dissolved in a solvent mixture comprising 1,3-dioxolane (DX) (42.6 wt %), 1,2-dimethoxyethane (DME) (52.1 wt %), and sulfolane (5.3 wt %), and also 3,5-dimethylisoxazole (DMI) (0.2 wt %). The cells were made with water content in the total electrolyte was about 120 parts by weight water per million parts by weight electrolyte (ppm).

The test results with respect to Experiment #2 cells indicate that the pulsed predischarge (pulsed limited drain) protocol employed with respect the fresh control cells, reduces the buildup of deleterious passivation layer on the lithium anode compared to the same fresh cells with same electrolyte, namely the test cell group, which was only subjected to a constant current predischarge protocol removing the same amount of cell capacity. This beneficial effect of the pulsed predischarge (pulsed limited drain) protocol is reflected in the above experimental data, wherein the internal impedance (resistance of the anode passivation layer) for the control cells subjected to pulsed predischarge was only 5.8 ohm, which was much lower compared to the test cells subjected to constant current predischarge, wherein the average impedance was 24.8 ohm. (The predischarge protocol also reduces the tendency for the cell's OCV (open cell voltage) to rise soon after, that is, within about one day after the cell is made.) It is inferred from the data that the presence of water in the control cells electrolyte (>100 ppm water in the total electrolyte) in combination with subjecting these cells to a pulsed predischarge protocol helps to achieve lower anode passive layer resistance. It is conjectured that the pulsed predischarge protocol in combination with the presence of water in the electrolyte in the control cells may result in a change in composition of the passive layer or retard its rate of buildup, thereby reducing the passive layer resistance in these cells. The net result is better cell discharge performance, which is verified by the higher number of pulsed cycles obtained for the control cells (mean average 582.8) than the test cells (mean average 555.6) as measured to 1.05 volt cutoff.

Description of Wound Cylindrical Cell

The cylindrical cell 10 may have a spirally wound electrode assembly 70 (FIG. 3) comprising anode sheet 40, cathode composite 62 with separator sheet 50 therebetween as shown in FIGS. 2-5. The Li/FeS$_2$ cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide (FeS$_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm) or other cylindrical size. However, it is not intended to limit the cell configuration to cylindrical shape. Alternatively, the cell of the invention may have a spirally wound electrode assembly formed of an anode comprising lithium metal and a cathode comprising iron disulfide (FeS$_2$) made as herein described inserted within a prismatic casing, for example, a rectangular cell having the overall shape of a cuboid. The Li/FeS$_2$ cell is not limited to a spirally wound configuration but the anode and cathode, for example, may be placed in stacked arrangement for use in coin cells as above indicated.

Figure 3:
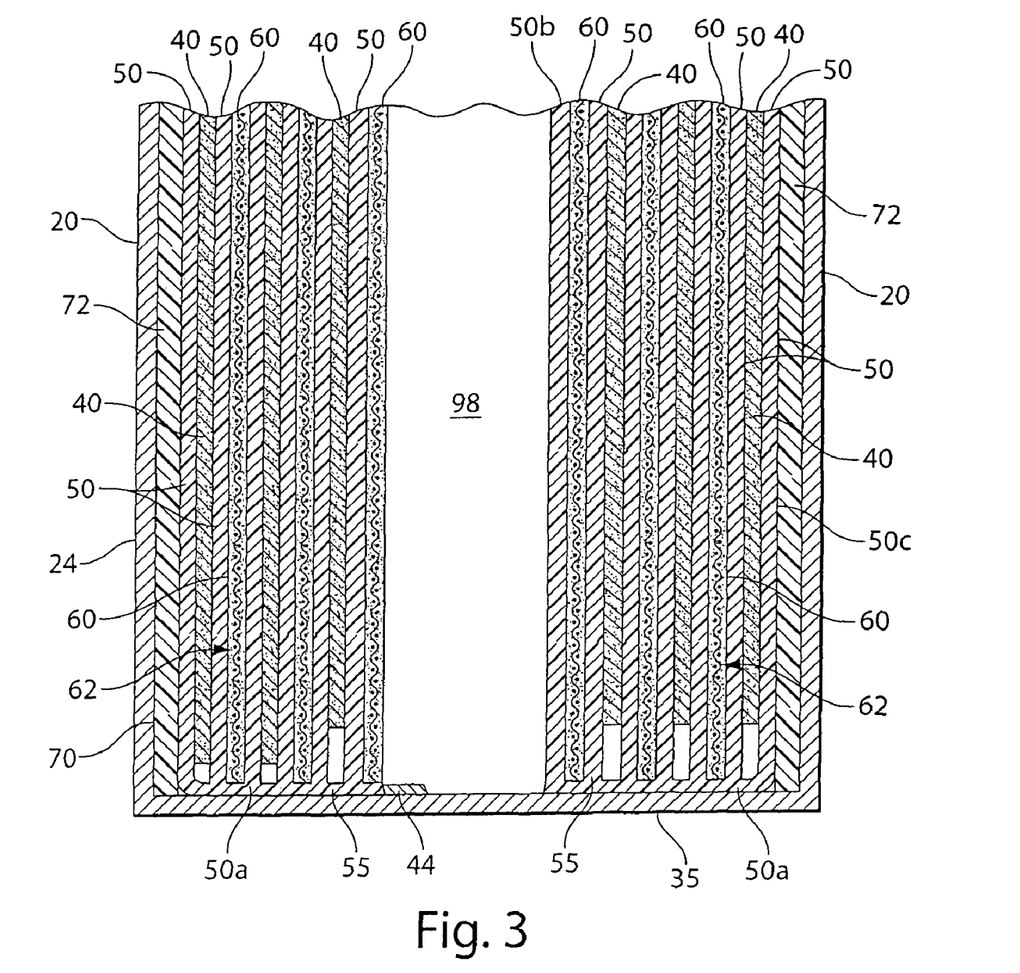
FIG. 3 is a partial cross sectional elevation view of the cell taken through sight lines 2-2 of FIG. 1 to show a spirally wound electrode assembly.
Figure 4:
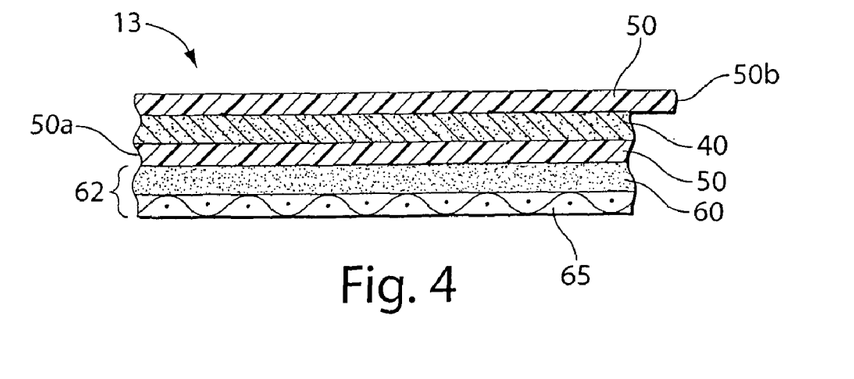
FIG. 4 is a schematic showing the placement of the layers comprising the electrode assembly.
Figure 5:
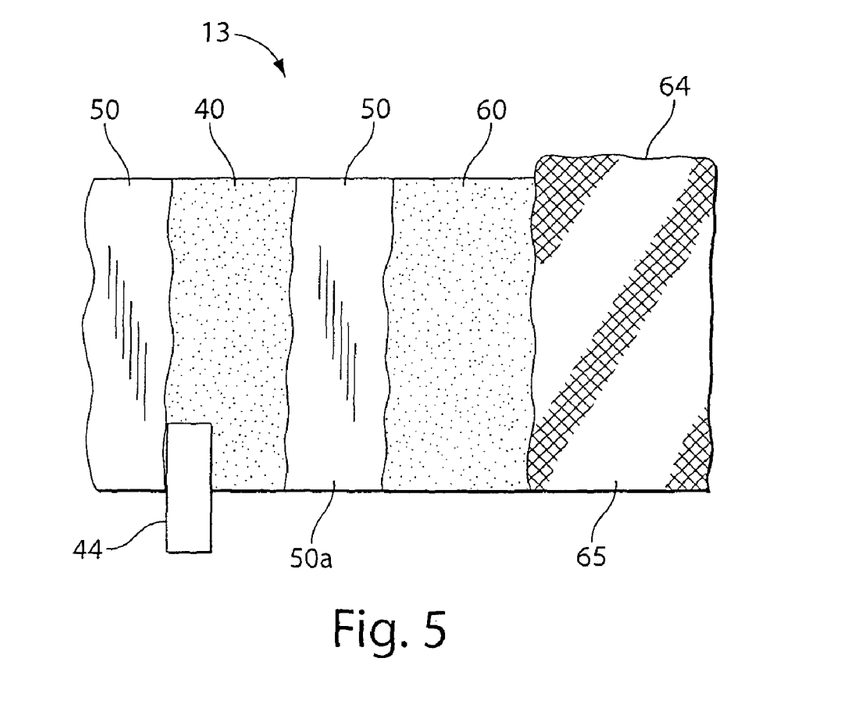
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide (FeS$_2$) coated onto metallic substrate 65 (FIG. 4).

The electrode composite 13 (FIGS. 4 and 5) can be made in the following manner: In accordance with the method of the invention the cathode 60 comprising iron disulfide (FeS$_2$) powder dispersed therein can be initially prepared in the form of a wet slurry which is coated onto a side of conductive substrate sheet 65, preferably a sheet of aluminum or stainless steel which may be a solid sheet with or without apertures therethrough, to form a cathode composite sheet 62 (FIG. 4). Conventional roll coating techniques may be used to coat the wet slurry onto a side of conductive substrate 65 (FIGS. 4 and 5). If an aluminum sheet 65 is used it may be a solid sheet of aluminum without openings therethrough or may be a sheet of expanded or perforated aluminum foil with openings therethrough thus forming a grid or screen. The apertures in substrate sheet 65 may be the result of punching or piercing holes therein.

The wet cathode slurry mixture having the composition shown above in Table 1 comprising iron disulfide (FeS$_2$), binder, conductive carbon and solvents is prepared by mixing the components shown in Table 1 until a homogeneous mixture is obtained.

The above quantities of components (Table 1) of course can be scaled proportionally so that small or large batches of cathode slurry can be prepared. The wet cathode slurry thus preferably has the following composition: $FeS_2$ powder (58.9 wt. %); Binder, Kraton G1651 (2 wt. %); Graphite, Timrex KS6 (4.0 wt %), Acetylene Black, Super P (1.5 wt %), Hydrocarbon Solvents, ShellSol A100 (13.4 wt %) and ShellSol OMS (20.2 wt %).

The $FeS_2$ powder (Pyrox Red 325) may be used directly as obtained from the supplier, Chemetall GmbH. Such product may be obtained from the supplier with a $CaCO_3$ additive already mixed into the $FeS_2$ powder. The $CaCO_3$ may typically comprise up to 1.5 wt. % of the $FeS_2$ powder. The $CaCO_3$ (or $CaCO_3$ containing compound) is added by the supplier to raise the pH of the $FeS_2$ in order to extend its storage life. That is, the elevated pH of $FeS_2$ resulting from the addition of $CaCO_3$ is intended to retard the rate of buildup of acidic contaminants within or on the surface of the $FeS_2$ particles as the $FeS_2$ is exposed to or stored in ambient air.

When it is desired to prepare the wet cathode slurry, the premix of $FeS_2$ powder and acetylene carbon black, is removed from storage and readied for admixture with binder and solvent solution. The mixture is stirred with graphite, binder and solvent as above described until a homogenous mixture is obtained, thus forming the wet cathode slurry.

After the wet cathode slurry is formed (Table 1), the wet slurry is then coated onto a side of the conductive substrate 65. The conductive substrate 65 with wet cathode slurry coated thereon is then dried in conventional convective oven (or in inert gas) to evaporate the solvents in the slurry, thereby forming a dry cathode coating 60 on one side of conductive substrate 65 (FIGS. 4 and 5). The process is repeated, if desired, to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. The drying of the wet cathode slurry coated on the metal substrate 65 is accomplished preferably by gradually adjusting or ramping up the oven temperature (to avoid cracking the coating) from an initial temperature of 40° C. to a final temperature not to exceed 130° C. for about 7-8 minutes or until the solvent has substantially all evaporated. (At least about 95 percent by weight of the solvents are evaporated, preferably at least about 99.9 percent by weight of the solvents are evaporated.) The dry cathode coating 60 (whether applied to only one side or both sides of conductive substrate 65) is then subjected to calendering to compress the thickness of said dry cathode 60, thus forming the completed cathode composite 62 (FIGS. 4 and 5).

The anode 40 can be prepared from a solid sheet of lithium metal. The anode 40 is desirably formed of a continuous sheet of lithium metal (99.8% pure). The lithium metal in anode 40 may be alloyed with small amounts of other metal, for example aluminum, or calcium which typically comprises less than about 1 or 2 wt. %, and even up to about 5 wt. % of the lithium alloy. The lithium which forms the anode active material, is preferably in the form of a thin foil. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of between about 0.09 and 0.20 mm desirably between about 0.09 and 0.19 mm for the spirally wound cell.

For an AA size $Li/FeS_2$ cell 10 there may typically be between about 4.5 and 5.0 grams of cathode active material, e.g. $FeS_2$ in the cathode. The amount of anode active material, namely, lithium or lithium alloy is determined by balancing the cell based on its theoretical capacity. In general the theoretical capacity of the anode involves computing the ideal capacity (mAmp-hrs) of all the anode active materials therein, and the theoretical capacity of the cathode involves computing the ideal capacity (mAmp-hrs) of all the cathode active materials therein. It shall be understood that the use of such terms theoretical capacity of anode and theoretical capacity of cathode as used in the present application shall be so defined. The "anode active" materials and "cathode active" materials are defined as the materials in the anode and cathode, respectively, which are capable of useful electrochemical discharge. (Only those portions of the anode and cathode with separator therebetween are considered.) That is, the "anode active materials" and "cathode active materials" promote current flow between the cell's negative and positive terminals when an external circuit between these terminals is connected and the cell is used in normal manner. In a wound cylindrical cell 10 wherein the anode active material is lithium metal (or lithium alloy) and the cathode active material is $FeS_2$ the theoretical specific capacity of the anode may be based on lithium at 3861.4 mAmp-hrs/g and the theoretical specific capacity of the cathode may be based on $FeS_2$ at 893.5 mAmp-hrs/g. The wound cylindrical cell 10 utilizing the electrolyte formulation of the invention may be balanced so that either the theoretical capacity (mAmp-hrs) of the anode or cathode is in excess or both are the same. The wound cell may typically be balanced so that the ratio of the theoretical capacity (mAmp-hrs) of the cathode to theoretical capacity of the anode (mAmp-hrs) is between about 1.05 and 1.15. Alternatively, the cell may be balanced so that the theoretical capacity (mAmp-hrs) of the anode to the theoretical capacity of the cathode is between about 1.05 and 1.15.

Individual sheets of electrolyte permeable separator material 50, preferably of microporous polypropylene or polyethylene having a thickness of about 0.025 mm or less is inserted on each side of the lithium anode sheet 40 (FIGS. 4 and 5). In a preferred embodiment the separator sheet may be microporous polyethylene or polypropylene of thickness about 0.016 mm. The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
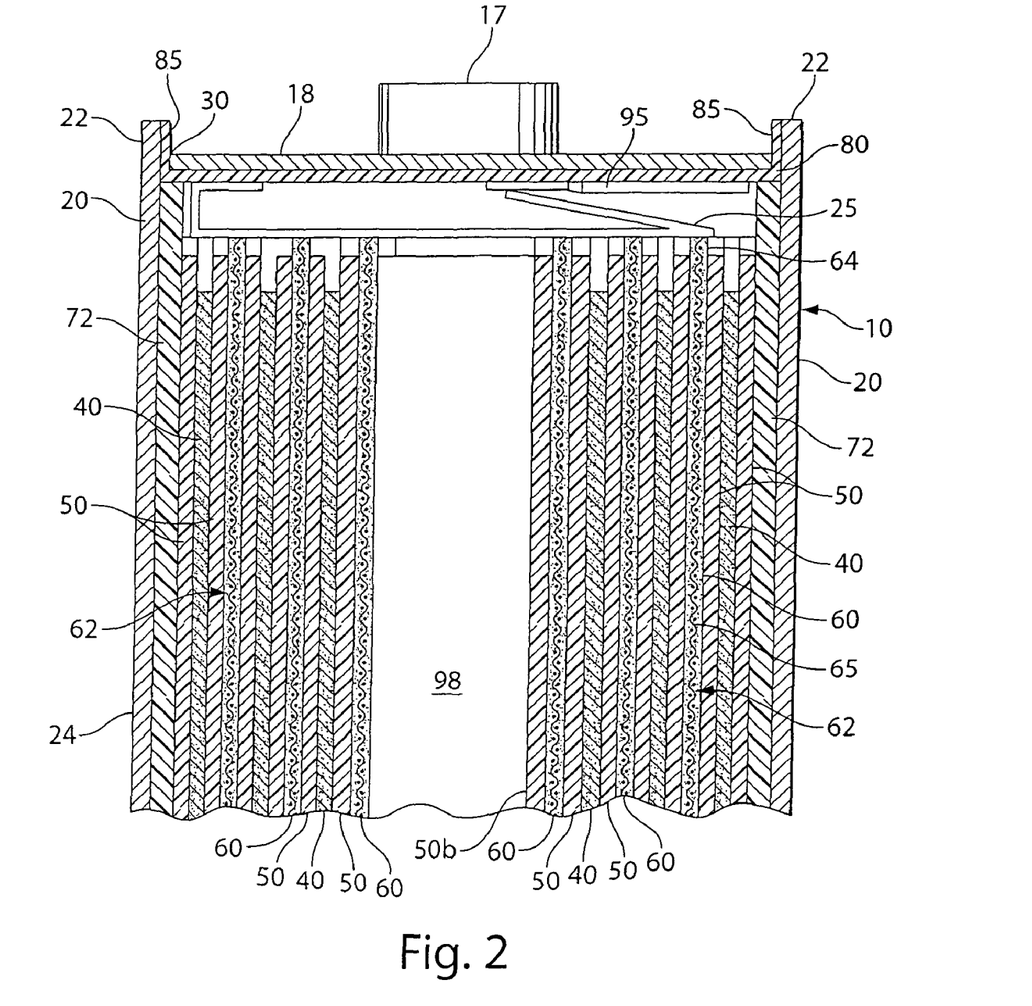
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polypropylene tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

The electrolyte can be added to the cell casing after the wound electrode spiral 70 is inserted. A preferred electrolyte solution comprises a mixture of lithium iodide (LiI) salt dissolved in a mixture of dioxolane (DX), dimethoxyethane (DME), and sulfolane. The dioxolane is preferably 1,3-dioxolane. The dioxolane may include alkyl substituted dioxolanes. The preferred dimethoxyethane is 1,2-dimethoxyethane.

A preferred electrolyte formulation of the invention which may be added to wound cell 10 comprises a lithium iodide salt dissolved in a solvent mixture comprising dioxolane, dimethyoxyethane, and sulfolane, wherein the weight ratio of dioxolane to dimethoxyethane is in a range between about 0.82 and 9.0, desirably between about 0.82 and 2.3. The dioxolane is preferably 1,3-dioxolane. The preferred dimethoxyethane is 1,2-dimethoxyethane. The sulfolane content in the electrolyte formulation of the invention preferably comprises greater than about 4.8 wt % of the solvent mixture. Preferably, the sulfolane comprises between about 4.8 and 5.3 wt % of the solvent mixture. However, the sulfolane may also be present in higher amount, for example, up to about 25 wt % of the above indicated solvent mixture wherein the weight ratio of dioxolane to dimethoxyethane is in a range between about 0.82 and 9.0. The electrolyte also optionally includes 3,5-dimethylisoxazole (DMI) in amount between about 0.1 and 1 wt. % of the solvent mixture, for example, about 0.2 wt %. The lithium iodide is typically present in the solvent mixture at a concentration of about 0.8 moles per liter.

The water content in the electrolyte of the invention for the wound cell 10 may typically be less than about 100 parts water per million parts total electrolyte. However, it is believed that water (deionized) may be added to the electrolyte solvents so that the water content in the electrolyte may be up to about 1000 ppm and even up to about 2000 ppm. (See commonly assigned patent application Ser. No. 12/009,858, filed Jan. 23, 2008.) Thus, it is believed that the water content in the electrolyte of the present invention may be between about 100 and 1000 ppm, for example, between about 500 and 1000 ppm, or between about 600 and 1000 ppm and up to about 2000 ppm, for example, between about 600 and 2000 ppm.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 extends into portion 64 extending from the top of the wound spiral as shown in FIG. 2. The cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel, or nickel plated steel, can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of closed end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp in a AA size cell for a prolonged period, the resistance of the PTC device increases dramatically, thus shutting down the abnormally high drain. It will be appreciated that devices other than vent 19 and PTC device 95 may be employed to protect the cell from abusive use or discharge.

Pulsed Predischarge Protocol to be Applied to AA size and AAA size Cylindrical Li/FeS$_2$ Cells A pulsed predischarge (limited pulsed drain) protocol can be beneficially applied to the AA cell 10 comparable to the manner it was applied to the coin cells. The pulsed predischarge protocol is applied effectively within about 24 hours (within one day) after the fresh cells are made. An effective predischarge protocol can comprises at least one and more typically at least two pulsed cycles. Each pulsed cycle consists of a pulse of current drain followed by a brief rest. Each pulse is of continuous current drain typically for a relatively short duration such as between about 2 and 20 seconds. The pulsed cycles are repeated until between about 2 and 10 percent of the cell's initial capacity is removed. Such pulses when applied may be at a fixed or variable current density desirably between about 1 and 50 mAmp per cm$^2$ of active interfacial area between anode and cathode.

The predischarge protocol as applied to an AA size Li/FeS$_2$ cell 10 typically consists of a multiplicity of pulse cycles, for example, involving typically between about 2 and 100 consecutive pulses therein, such as 5, 10, 15, 20 or more consecutive pulsed cycles, for example, between about 20 and 40 pulsed cycles with said short intermittent rest typically between about 10 and 100 seconds between pulses. A specific preferred predischarge protocol of a AA LiFeS$_2$ cell having more than 100 ppm of water in electrolyte, e.g. between about 100 and 300 ppm water, consists of between about 20 and 40 pulsed cycles. The current drain in each cycle pulse is between about 1 and 3 Amp, for example, about 2 Amp for 5 to 10 seconds duration immediately followed by a 15 to 30 second rest period.

Pulsed Predishcharge (Pulsed Drain) Protocol for AA and AAA Size Li/FeS$_2$ Cells with Wound Electrode Assembly and Preferred Electrolyte The above described experimental results for coin cells 100 reflecting the beneficial effect of a pulsed predischarge (pulsed limited drain) protocol to reduce the lithium anode passive layer resistance, that is, retarding the rate of buildup of deleterious passivation layer on the anode of the Li/FeS$_2$ cell, can be achieved as well in AA and AAA size cylindrical cell. The pulsed predischarge protocol applied to the coin cells 100 were prorated to result in comparable pulsed discharge protocol applicable to AA and AAA size cylindrical cell with wound electrodes such as cell 10. Parameters such as current density (Amp/cm$^2$) for the pulsed current drain as applied to the coin cells as well as the cell's anode/cathode interfacial surface area and anode and cathode loading were taken into account in order to accomplish the proration to AA and AAA size cells.

Thus, for the AA size Li/FeS$_2$ cylindrical cell of which cell 10 is representative, the following protocol has been determined to be applicable for the same electrolyte system, namely, electrolyte lithium salt, preferably lithium iodide, dissolved in a solvent system comprising dioxolane, dimethoxyethane, and sulfolane. The electrolyte may have a water content between about 100 and 2000 ppm, between 600 and 2000 ppm, or between 600 and 1000, or between about 100 and 300 ppm. A specific preferred water content in the electrolyte may be between about 100 and 300 ppm. The preferred electrolyte compositions are the same as previously described herein, desirably, a weight ratio of dioxolane to dimethoxyethane between about 0.82 and 9.0, typically between about 0.82 and 2.3 and a sulfolane content greater than about 4.8 percent by weight, preferably between about 4.8 and 5.3 percent by weight of the solvent mixture. For such AA size Li/FeS$_2$ cell 10 an effective predischarge (limited drain) protocol has been determined to be a pulsed protocol which is applied within about 24 hours (1 day) after the fresh cell 10 is made, that is, within about one day after the cell contents are inserted into casing 20 and open end 30 of the cell is closed. The effective predischarge (limited drain) protocol for the AA size Li/FeS$_2$ cell, of which cell 10 is representative, is as follows:

Apply at least two pulsed cycles in sequence, wherein each pulsed cycle comprises:

i) applying a current drain of between about 1 and 3 Amp to the cell for a period of between about 2 and 20 seconds;

ii) resting the cell for a duration of between about 10 and 100 seconds before the next current drain.

Preferably, the current drain applied in each pulsed cycle above described is between about 1.5 and 2.5 Amp. The number of pulsed cycles applied in sequence is between about 2 and 100, preferably between about 20 and 40.

The same protocol may be used with respect to the AAA size Li/FeS$_2$ cell 10 as is above described for the AA cell, except that the current drain in each pulsed cycle is lower, namely between about 0.5 and 1.5 Amp, preferably, between about 0.75 and 1.25 Amp.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode comprising iron disulfide (FeS$_2$) and conductive carbon, said cell further comprising an electrolyte inserted therein, said electrolyte comprising a lithium salt dissolved in a solvent mixture comprising dioxolane, dimethoxyethane, and sulfolane, wherein deionized water is added to the electrolyte so that the water content in said electrolyte is between 600 and 2000 parts by weight water per million parts by weight electrolyte.

2. The cell of claim 1 wherein the water content in said electrolyte is between 600 and 1000 parts by weight water per million parts by weight electrolyte.

3. The cell of claim 1 wherein said dioxolane comprises 1,3-dioxolane.

4. The cell of claim 1 wherein said dimethoxyethane comprises 1,2-dimethoxyethane.

5. The cell of claim 1 wherein said lithium salt comprises lithium iodide (LiI).

6. The cell of claim 1 wherein the weight ratio of dioxolane to dimethoxyethane is between 0.82 and 9.0.

7. The cell of claim 1 wherein the weight ratio of dioxolane to dimethoxyethane is between 0.82 and 2.3.

8. The cell of claim 6 wherein said sulfolane is greater than 4.8 percent by weight of the solvent mixture.

9. The cell of claim 6 wherein said sulfolane is between 4.8 and 6.0 percent by weight of the solvent mixture.

10. The cell of claim 6 wherein said solvent mixture further comprises between 0.1 and 1.0 percent by weight 3,5-dimethylisoxazole.

11. The cell of claim 1 wherein said anode and cathode are spirally wound with a separator sheet therebetween.

12. The cell of claim 1 wherein said cathode comprising iron disulfide (FeS$_2$) and conductive carbon is coated onto a substrate sheet comprising aluminum.

* * * * *